April 1, 1952   R. M. MAGNUSON   2,590,987
SLICING MACHINE AND METHOD
Original Filed April 7, 1945   4 Sheets-Sheet 1
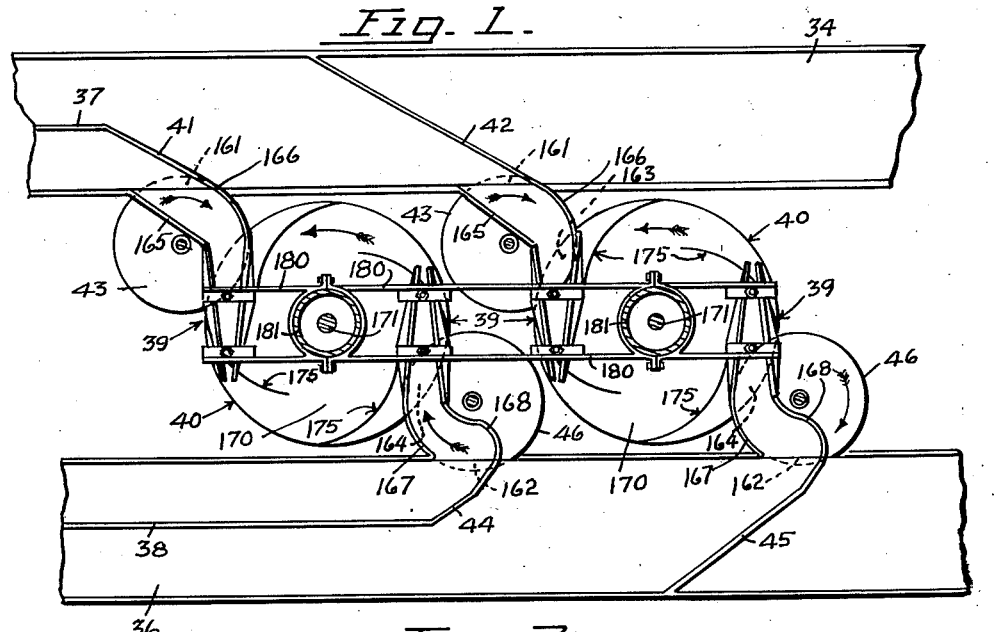
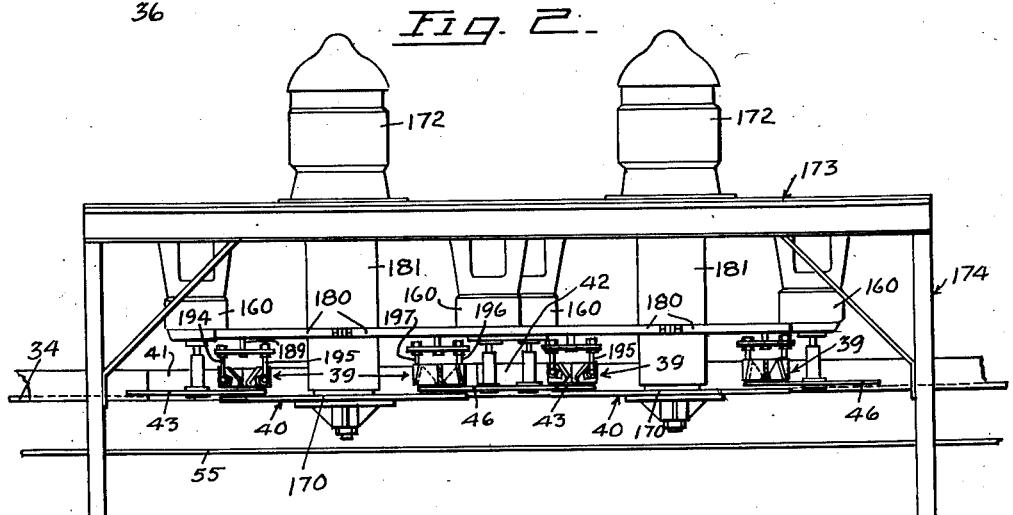
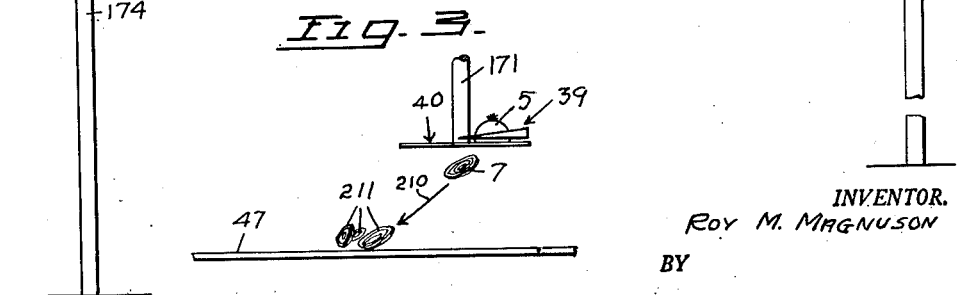
INVENTOR.
ROY M. MAGNUSON
BY
Boyken, Mohler & Beckley
ATTORNEYS.

April 1, 1952 R. M. MAGNUSON 2,590,987
SLICING MACHINE AND METHOD
Original Filed April 7, 1945 4 Sheets-Sheet 2
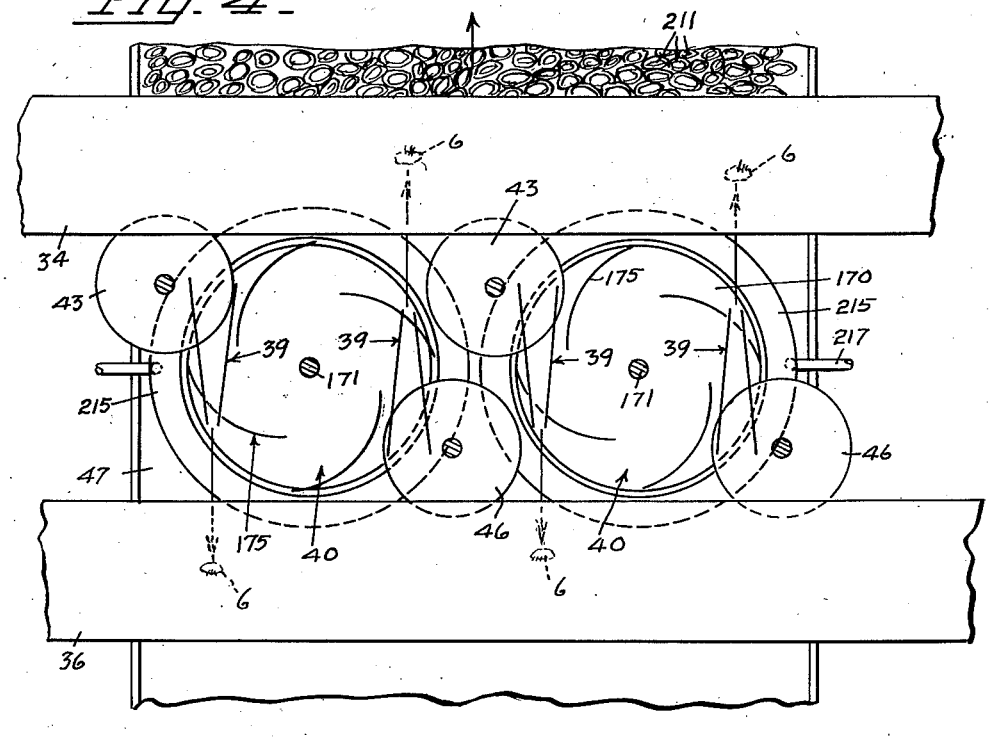
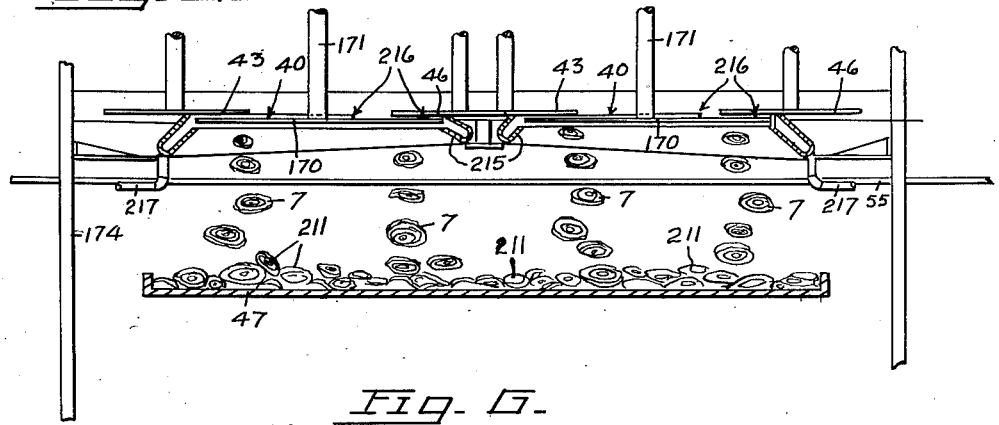
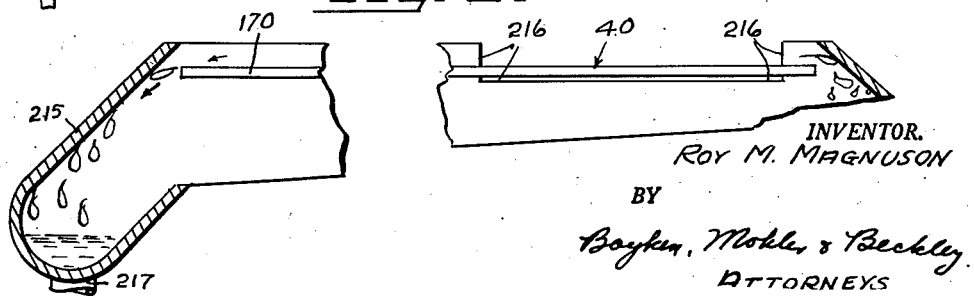
INVENTOR.
ROY M. MAGNUSON
BY
Boyken, Mohler & Beckley
ATTORNEYS April 1, 1952 R. M. MAGNUSON 2,590,987
SLICING MACHINE AND METHOD
Original Filed April 7, 1945 4 Sheets-Sheet 3
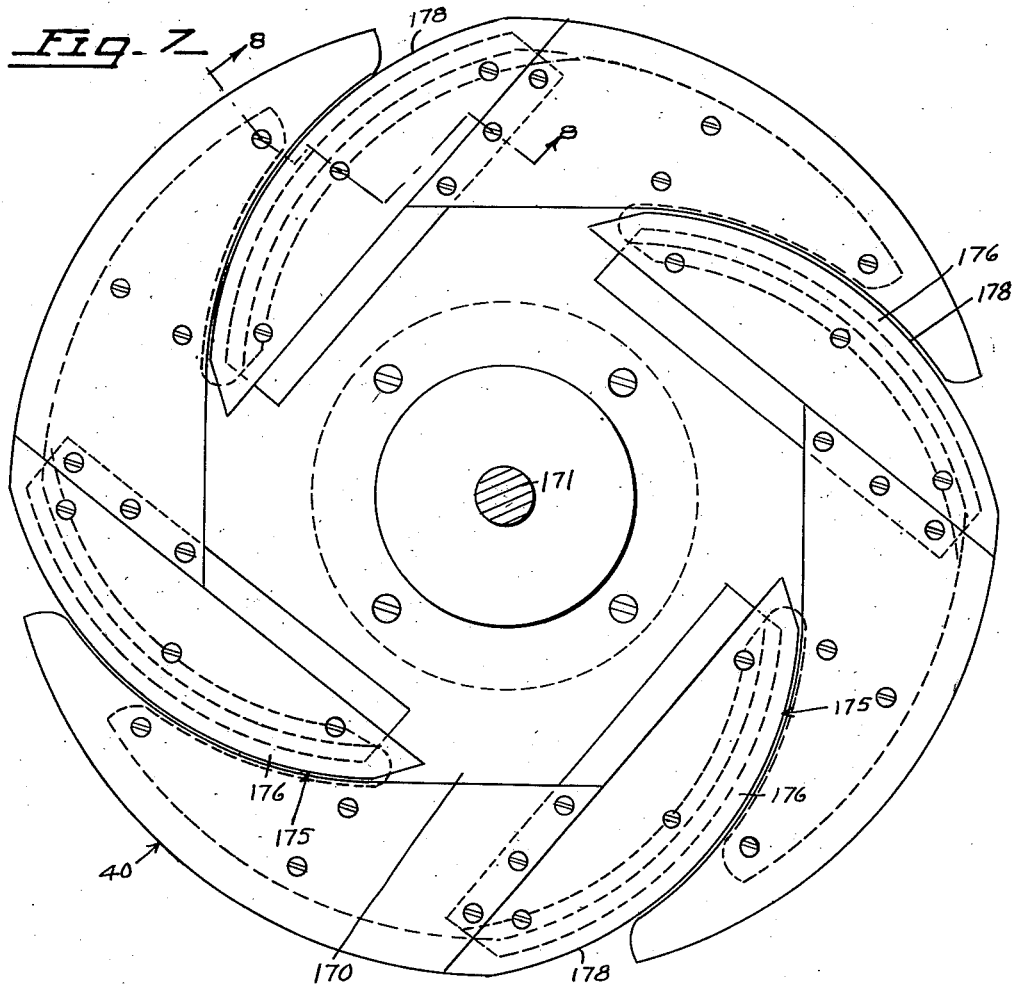
INVENTOR.
ROY M. MAGNUSON
BY
Boyken, Mohler & Beckley
ATTORNEYS

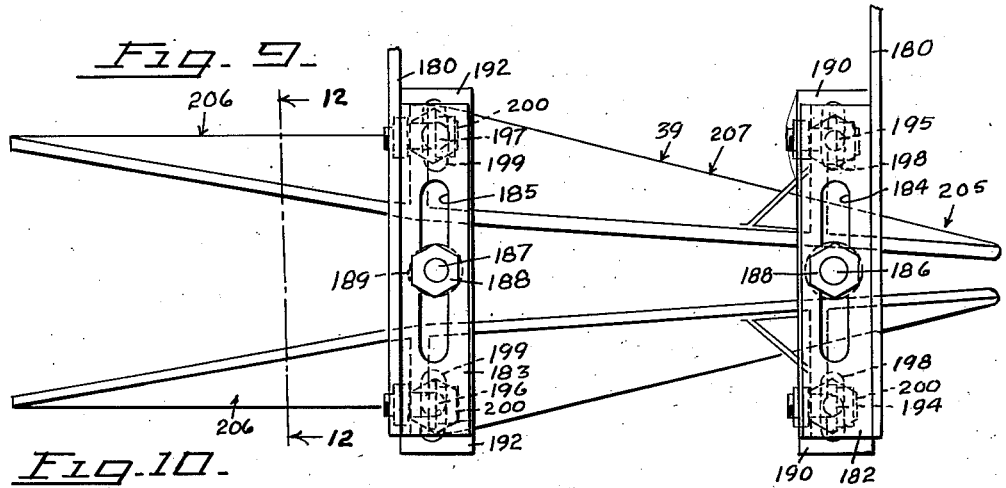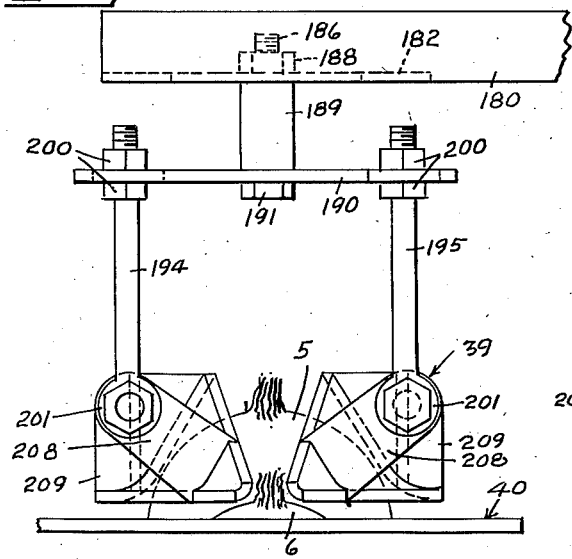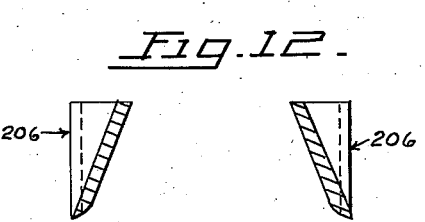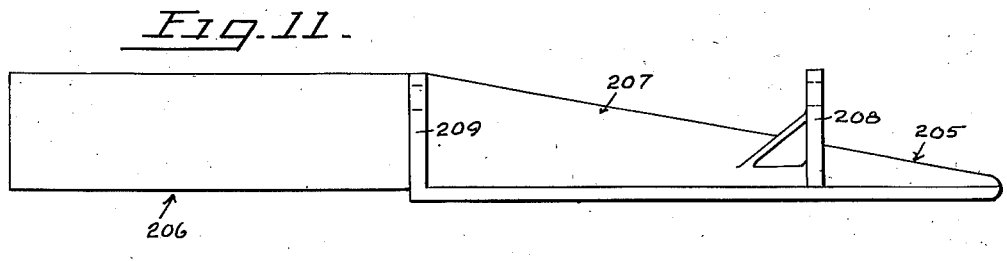

Patented Apr. 1, 1952

2,590,987

UNITED STATES PATENT OFFICE 2,590,987

SLICING MACHINE AND METHOD

Roy M. Magnuson, San Jose, Calif., assignor to Basic Vegetable Products Co., Vacaville, Calif., a co-partnership composed of W. M. Hume and J. H. Hume Original application April 7, 1945, Serial No. 587,124, now Patent No. 2,577,086, dated December 4, 1951. Divided and this application October 11, 1948, Serial No. 53,921

6 Claims. (Cl. 146—241)

This invention relates to a slicing machine and is a division of copending application Serial No. 587,124, filed April 7, 1945, which became Patent Number 2,577,086 on December 4, 1951.

One of the objects of the present invention is the provision of an improved method of slicing onions and other vegetables having root and stem ends.

Another object of the invention is the provision of an apparatus adapted to automatically slice onions and other vegetables having root and stem ends, and to automatically reject or discard the root and stem ends that said ends will not be mixed with the slices.

Another object of the invention is the provision of improved means for slicing onions and the like and for uniformly distributing the slices on conveying means for dehydration of said slices.

A still further object of the invention is the provision of a slicing machine adapted to slice onions, after they have been bisected at right angles to their root-stem axes, from the cut faces of the halves toward their root and stem ends, and which machine automatically discharges the said ends separate from the slices.

In dehydrating onions, they are first sliced at right angles to their root-stem axes. The root and stem ends have heretofore become mixed with the slices, requiring inspection and the picking out of the said ends before the slices go to the dehydrator. These root and stem ends are not always discovered by this method, and an inferior batch of dehydrated onions results where they become mixed with the good slices. Inspection and sorting after dehydration is difficult, if not impossible, due to the fact that many of the onion rings in the slices become separated and the slices are indistinguishable from the smaller pieces and shrivelled rings.

Furthermore, in the process of drying onions, it is important that the drying of the slices be done uniformly. This requires an even or uniform distribution on the trays that go through the dehydrator.

By the present invention the root and end pieces are automatically removed and the slices are uniformly and automatically distributed on the trays.

Other objects and advantages will appear in the description and in the drawings.

It is to be understood that the drawings and description are illustrative of a preferred apparatus or machine and method for accomplishing the desired results, and are not to be considered restrictive of the invention. Also while the description and its claims specifically refer to onions in many instances, this is not to be interpreted as necessarily restricting the invention to onions inasmuch as there may be other vegetables and also fruit that could be handled by the apparatus in the same manner as onions.

In the drawings,

Fig. 1 is a sectional view showing the slicing knives or slicer mechanism that includes the transfer disks and conveyors associated therewith, but omitting the juice collectors for collecting and separating the juice resulting from slicing.

Fig. 2 is a side elevational view of the slicer mechanism omitting the near conveyor and juice collectors, but showing the frame and motors for the cutters and transfer disks.

Fig. 3 is a diagrammatic view showing the angular path of travel of slices cut by the cutters of Fig. 8 and showing how they strike the trays and break up into separate rings.

Fig. 4 is a semi-diagrammatic view showing the onion juice separators or collectors in top plan view around the cutters.

Fig. 5 is a semi-diagrammatic elevational view of the cutters showing the juice collectors in section.

Fig. 6 is an enlarged fragmentary sectional view of a portion of one of the juice collectors, the cutter being in elevation.

Fig. 7 is an enlarged plan view of one of the onion slicing knives, the central shaft being in section.

Fig. 8 is an enlarged sectional view taken along line 8—8 of Fig. 7.

Fig. 9 is an enlarged plan view of one of the holders for onions during the slicing of the latter.

Fig. 10 is an end view of the holder of Fig. 9 showing part of the slicing blade and showing the onion halves in position on the slicing blade including a root or stem end ready for ejection.

Fig. 11 is a side elevational view of the holder of Fig. 12 without the supports.

Fig. 12 is a sectional view taken along line 12—12 of Fig. 9.

In detail, the onions, vegetables or fruit, are preferably bisected before being delivered to the slicing machine of this invention, and are arranged on an endless belt conveyor with their cut faces against such conveyor. The slices are laterally shunted off said conveyor onto a pair of parallel horizontally extending endless belts that extend along opposite sides of the actual slicing mechanisms, all as shown in my copending application Serial No. 587,124, filed April 7, 1945, which became Patent No. 2,577,086 on December 4, 1951. The means for bisecting the onions and for arraying the halves face downwardly on the single conveyor, and for shunting the halves onto the spaced pair of conveyors are not shown herein, inasmuch as the present invention is restricted to the slicing apparatus which includes one or both of the conveyors that extend along opposite sides of the actual slicers.

Parallel spaced conveyor belts 34, 36 as shown in Fig. 1 extend along opposite sides of the actual slicing devices and are adapted to carry onion halves therein from left to right as seen in Fig. 1 with the cut faces of said halves against the belt. A partition 37 (Fig. 1) in belt 34 and a similar partition 38 on belt 36 divides the flow of onion halves on the belts 34, 36 for distribution of the halves to a plurality of holders 39 (in this instance four holders are provided) where the onions are sliced by rotary cutters 40. Shunt walls 41, 42 over belt 34 direct the onions at opposite sides of partition 37 to two of said holders over intermediate transfer disks 43. Shunt walls 44, 45 over belt 36 respectively direct the onion halves at opposite sides of partition 38 to two of said holders 39 over intermediate transfer disks 46. Transfer disks 43, 46 accelerate the speed of the onions thereon to nearly the speed of the cutters.

The onion slices are thrown from high speed cutters 40 onto trays 47 so as to strike the trays at an angle of substantially less than 90° thereby causing the rings in each slice to separate from each other (Fig. 3). The said cutters are arranged so that the rings will be uniformly distributed on the trays. By separating the rings in the slices from each other the drying process is greatly expedited and uniformity of drying is effected. The trays 47 are carried on any suitable conveyor below the cutters at the desired rate of speed for proper distribution of the slices. The cutters preferably have a peripheral speed of from about 2,000 to 7,000 feet per minute.

The holders 39 are so arranged as to release the root and stem ends of the onion halves as soon as said ends are substantially all that remains of each half after the desired slices are dropped onto the trays. This structure will be more fully explained later.

The root and stem ends released from the holders are ejected onto conveyors 55 which may be the lower runs of belts 34, 36 respectively, or separate conveyors. Such ends may be discharged from said belts in the conventional manner onto any suitable conveyor or into any suitable collecting chute or the like. Thus an automatic separation of the root and stem ends from the desirable slices is effected.

The transfer disks 43, 46 are identical with each other in structure, each being preferably driven from above by its own motor 160 (Fig 2) in the direction of the arrow indicated on each disk in Fig. 1. One marginal portion 161 of each transfer disk 43 extends just below belt 34 adjacent the shunt walls 41, 42 respectively. The disks 46 that are adjacent belt 36 likewise have a marginal portion 162 extending under said belt.

The rotary circular cutters 40 are each between one of the transfer disks 43 and one of the disks 46. In other words, one set of transfer disks comprising one disk 43 and one disk 46 is provided for each rotary cutter 40 at opposite sides of each cutter. Onion halves (face down) are fed onto one set of transfer disks by shunt walls 41, 44, while onion halves are fed onto the other set of transfer disks by shunt walls 42, 45.

A marginal portion 163 of each of the transfer disks 43 extends over a marginal portion of each rotary cutter 40 at one side of the central axis of the latter and a marginal portion 164 of each of the transfer disks 43 extends over a marginal portion of each cutter at the opposite side of said central axis (Fig. 1).

The direction of movement of the transfer disks is such that onion halves carried thereon from belts 34, 36 to cutters 40 will be moving in the same general direction as the cutters 40 at marginal portions 163, 164 on the disks. Spaced guide strips 165, 166 over disks 43 guide the onions onto the rotary cutters, while spaced guide strips 167, 168 over disks 46 perform a similar function.

The rotary cutters 40 are identical. Each comprises a circular disk 170 centrally secured on the lower end of a drive shaft 171 that extends downwardly from a motor 172. Motors 172 are secured to a frame 173 that carries the same and the cutters and supports the upper sides of said disks 170 in proper relation to disks 43, 46 that are also carried on said frame. The legs 174 of said frame may support the transfer disks in proper relation to belts 34, 36 (Fig. 2).

Each disk 170 is formed with a plurality of slits or slots 175 extending arcuately inwardly from the edge of the disk and generally about equally spaced similar axes equally spaced from each other and from the central axis of each disk 170 (Fig. 7).

Along the convexly curved edge of each slot and defining said edge is a removable cutting blade 176 having a convexly curved cutting edge 178 spaced above the main plane of the disk 170. Thus upon rotation of the disk 170 with the convex edges 178 leading, any onions on said disk and in the paths of said edges 178 will be sliced by each of said blades 176 (Figs. 7, 8).

In the drawings, each rotary cutter has four equally spaced cutting blades and the cutting edges of these are so arranged that onions being cut tend to be forced radially outwardly of the central axis of the disk.

The holders for onions, generally indicated at 39 in Figs. 1, 2, are shown in detail in Figs. 9 to 12 inclusive.

Holders 39 are suspended over the marginal portions of the circular cutters 40 from a pair of supporting members 180 that are in turn secured to tubular housings 181. These housings are secured to the motors 172 or to frame 173 as may be desired. The members 180 of said pair may respectively be formed with several horizontal pieces 182, 183. Said pieces are in pairs opposed to each other at opposite sides of each of the housings 181, there being one pair of pieces 182, 183 to each of the holders 39. The members 180 and pieces 182, 183 thereon are parallel and each pair of pieces 182, 183 is arranged over opposite marginal portions of each cutter 40 about midway between the belts 34, 36.

A slot 184 is formed in each piece 182 extending longitudinally thereof and a similar slot 185 is formed on each piece 183 (Fig. 9). The upper end of a vertical bolt 186 extends through each slot 184 and the upper end of a vertical bolt 187 extends through each slot 185. A nut 188 is on each bolt 186, 187 above pieces 182, 183 and a spacer 189 is below each such piece (Fig. 10).

A horizontal elongated plate 190 is secured intermediate its ends on the lower end of each bolt 186 between the head 191 of the bolt and the spacer 189, while a horizontal elongated plate 192 is secured intermediate its ends on the lower end of each bolt 187 between the head of said bolt and the spacer thereon.

Depending from the ends of each plate 190 are a pair of vertical bolts 194, 195 and a similar pair of vertical bolts 196, 197 depend from the ends of plate 192. The bolts 194, 195 extend through slots 198 in plate 190 and bolts 196, 197 extend through slots 199 in plate 192. The slots in each plate extend longitudinally thereof and nuts 200 on the bolts 194 to 197 inclusive above and below plates 190, 192 releasably secure the bolts to said plates for adjustment of the bolts longitudinally of the slots as well as axially of the bolts.

The lower ends of bolts 194 to 197 inclusive are formed with horizontally directed eyes 201 (Fig. 10) for bolting said lower ends to the holders 39. Thus the bolts 186, 194, 195, 196, 197 form hangers for each holder. The bolts 194, 196 are spaced from similar sides of bolts 186, 187, while bolts 195, 197 are spaced from the opposite similar sides of said bolts 186, 187. The holders 39 are in two halves, one of which halves is carried by bolts 194, 196, while the other half is carried by bolts 195, 197. Thus, by adjusting bolts 195, 197 toward or away from bolts 194, 196, the halves may be moved closer together or farther apart and by adjusting the nuts 200 axially on bolts 194 to 197 the halves may be moved toward or away from the rotary cutter therebelow. The bolts 186 provide for bodily adjustment of the holders toward or away from the central axis of the rotary cutters. It is thus seen that the holders and the halves thereof are capable of being adjusted to meet every condition.

The halves of holders 39 are complementary to each other and each half comprises a specially formed plate having what may be called a toe portion 205 and a heel portion 206 and intermediate body portion 207 (Figs. 9, 11). Between the toe portion and body portion of each half is an ear 208 that is apertured for bolting to the eye at the lower end of one of bolts 194, 195 as the case may be, while an ear 209 is between the heel and body portion of each half is apertured for bolting to the eye at the lower end of one of the bolts 196, 197.

The heel portions 206 of the halves of each holder connects with the guides 165, 166 (Fig. 1), or with guides 167, 168 according to the positions of the holders, inasmuch as the onions enter the holders between said heel portions. Said heel portions in each holder may be horizontally elongated flat plates that are preferably inclined between 60° and 70° relative to horizontal (Fig. 12) with their opposed surfaces facing generally downwardly. The lower edges of the heel portions of each plate are slightly higher than the lower edges of the body and toe portions so as to clear the transfer disks 43 over which said heel portions extend.

The body portions 207 of each holder are flat plates integral with the respective heel portions and are in continuation thereof, but they are preferably inclined relative to horizontal no more than 60° (Fig. 10). The vertical width of the plate forming the body portion of each half is progressively less in direction toward the toe portion. The upper edge of the body portion of each half is inclined to provide for thus decreasing width while the lower edge is horizontal and substantially parallel with the cutter therebelow, it being understood that the body and toe portions of the holders are directly over the marginal portions of the circular cutters.

The toe portion 205 of each half is merely a continuation of the body portion, and the upper and lower edges of each toe portion also continues in alignment with the upper and lower edges of the body portion. The plates comprising the body and toe portion of each half of each holder come to a substantial point at the outer end of the toe portion, and the lower marginal portions of the opposed body and toe portions of each holder are turned oppositely outwardly so as to form rounded lower edges on said holder.

The onion halves upon being directed between the heel portions of each holder are moving at substantially the same speed as the speed of the cutters, therefore, upon said onion halves passing onto the cutters from said transfer disks, the said halves will not be upset by contact with the cutter blades before the same are held against the downwardly inclined sides of the body portions of the holders during actual slicing.

In Fig. 10 an onion half 5 is shown at the beginning of the slicing operation. As the holders 39 are quite close to the outer edges of the circular cutters 40 the onion halves are positioned where the speed of travel of the cutting blades is fastest and the arcuate linear contour of the cutting edges is such that the slicing is accomplished progressively across the body of each onion half in direction generally radially relative to the axis of each cutter.

As the slicing of each half continues from the cut face toward the root or stem end, the halves continue to move in the holders toward the toe of each until the root or stem end 6 (Fig. 10) is all that is left, and at this point said root or stem end is at a level where it is released from engagement with the holder for ejection from the cutter by centrifugal force. The fact that the holder is in halves that are spaced apart provides an opening between the apices of the toe portion for permitting the upstanding or projecting tuft from the root or stem ends to pass through said opening.

The force with which the root and stem ends are ejected from the cutters is sufficient to throw said ends onto conveyor belts 55 (Fig. 2) which may be the lower runs of conveyors 34, 36, or they may be separate conveyors should there be any objections to depositing the said ends on the inner sides of said belts 34, 36. In any event, the root and stem ends are automatically separated from the onion slices. The latter, as they fall from the cutters, will be deposited on the trays moving therebelow and the distribution of the holders and cutters is such as to insure a substantially uniform distribution of the slices on the trays.

In Fig. 3 one of the cutters 40 is indicated with an onion half 5 thereon. The slices 7 are seen to follow the downward path 210 that is at less than a right angle with respect to tray 47 and the plane in which the slices 7 are disposed while in said path is such that the edge of each slice strikes the tray instead of the slices dropping in horizontal planes. The peripheral speed of the cutters at the point where the slices are cut is from about 2,000 to 7,000 feet per second and this has a great deal to do with the path taken by the slices.

The angle at which the slices strike tray 47 and their velocity results in each slice separating into its rings 211, thus producing a layer of separate onion rings on the tray through which the drying air can readily circulate. Drying is uniform as a result and one of the heretofore baffling problems is solved.

The importance of this uniform drying is readily apparent when it is considered that the onion slices are eventually dried to the point where they contain less than 5% moisture by weight. In the conventional methods heretofore used some slices might break up into separate rings on the trays, while others remained whole, and still others were in stacks or at least in pairs flat together thus making it almost impossible to effectively dry them. By the time the slices that were separated into rings had dried to the desired degree, those slices that were whole and in stacks or pairs might contain from 6% to 10% moisture by weight and even more. Thus, to make the average moisture content 5% or less would result in some of the onions being practically charred while others were still relatively moist.

By the present invention as above described, the thickness of the layer of onions on the tray may be increased over previous methods and uniform drying will still be accomplished. It might be added that the breaking of the onion slices into rings also produces a greater uniformity in the layers, whereas heretofore the layers were somewhat spotty inasmuch as the onion slices tended to stay on the tray in files directly below the cutters.

In the cutting of onions it has heretofore been the practice to permit the water or juice to mix with the slices. In fact, it has been unavoidable in most instances. Where the cutters have a relatively high peripheral speed, as in the present instance, this moisture is thrown off by centrifugal force and is collected in the annular trough 215 (Fig. 4) that surrounds each of the circular cutters. The trough is disposed outwardly of the periphery of each cutter (Fig. 6) a sufficient distance so as not to interfere with the falling slices 7 (Fig. 5) that are cut close to the periphery of each cutter. At those points around each cutter where the root and stem ends 6 are thrown off (Fig. 4) the upper outer edge of the outer side of each trough is cut away as at 216 (Fig. 6) so as not to interfere with the discharge of the said root and stem ends.

From the foregoing description it is seen that a triple action automatically occurs in the slicing step, namely (1) the free moisture resulting from the slicing step is separated from the cut slices, being carried off by any suitable conduit 217 leading from the lower portion of each trough or collector 215; (2) the root and stem ends are automatically separated from the slices, and (3) the slices are broken up into their separate rings.

The ultimate end accomplished by these triple steps is a fast and uniformly dried quantity of sliced onions, inasmuch as the slow drying and undesirable stem and root ends are eliminated, and the water or free moisture due to cutting is taken away, and the slices are separated into separate rings. By referring to the stem and root ends as being undesirable, I mean that their mixture with the slices is undesirable, both from the standpoint of the finished product and from the standpoint of drying.

I claim:

1. An onion slicer comprising a horizontally disposed disk supported from above for rotation about its central vertical axis, means above said disk for so rotating it, said disk being formed with a slot extending generally outwardly relative to said axis and provided with a cutting edge along one side of said slot projecting upwardly relative to the upper surface of said disk for slicing an onion half adapted to be supported on said surface with its cut face down, conveyor means below said disk for receiving slices adapted to be cut from said halves, feed means for delivering onion halves in single file onto the upper side of said disk with their cut faces down, means for guiding such halves to a position for cutting by said cutting edge, means for holding said halves during said cutting by said edge, said last mentioned means comprising elongated guide members spaced above said disk and from each other and extending generally convergently from said feed means.

2. An onion slicer comprising a horizontally disposed disk supported from above for rotation about its central vertical axis, means above said disk for so rotating it, said disk being formed with a slot extending generally outwardly relative to said axis and provided with a cutting edge along one side of said slot projecting upwardly relative to the upper surface of said disk for slicing an onion half adapted to be supported on said surface with its cut face down, conveyor means below said disk for receiving slices adapted to be cut from said halves, feed means for delivering onion halves in single file onto the upper side of said disk, with their cut faces down, said feed means including a horizontal conveyor belt alongside said disk at a level above that of said disk and a rotary horizontal transfer plate between said belt and said disk, said plate extending below said belt at a point along one edge thereof and extending above said disk at another point along its said edge, said belt being adapted to carry onion halves to said plate, means for shunting such halves onto said plate, and means for guiding the halves on said plate onto the upper side of said disk.

3. An onion slicer comprising a horizontally disposed disk supported for rotation about its central vertical axis, means for so rotating said disk, said disk being formed with a slot extending generally outwardly relative to said axis and provided with a cutting edge along one side of said slot projecting upwardly relative to the upper surface of said disk for slicing onion halves adapted to be supported on said upper surface with their cut faces down, means at opposite sides of said axis for feeding such halves onto said disk from said opposite sides, conveyor means below said disk for receiving the slices cut from said halves, a holder over each disk for holding such halves at said opposite sides of said axis during slicing thereof, means for adjusting the positions of said holders toward and away from said axis and toward and away from said upper surface.

4. An onion slicer comprising a rotary cutter, means for supporting an onion half against a side of said cutter for progressively slicing said onion, means for rotating said cutter at a relatively high speed for throwing the juice resulting from the slicing of said onion outwardly thereof by centrifugal force, a juice collector around said cutter and disposed radially outwardly thereof for collecting said juice, and a conduit for carrying such juice away from the slices.

5. An onion slicer comprising a rotary cutter, means for supporting an onion half against a side of said cutter for progressively slicing said onion, means for rotating said cutter at a relatively high speed for throwing the juice resulting from the slicing of said onion outwardly thereof by centrifugal force, a juice collector around said cutter and disposed radially outwardly thereof for collecting said juice, and a conduit for carrying such juice away from the slices, said means for supporting such onion half being a holder formed with opposite sides disposed convergently relative to each other in the direction of rotation of said cutter, the convergent ends of said holder being spaced apart a predetermined distance and spaced a predetermined distance from said cutter to permit a portion of such onion of predetermined width and thickness to pass said ends for ejection from said cutter generally tangentially thereof by centrifugal force at a predetermined point around said cutter, said collector being relieved at said point to permit passage of such portion past said collector free from interference by the latter.

6. The method of slicing onions that comprises the steps of progressively slicing each onion transversely of its root-stem axis, causing each of the slices to follow a predetermined path of travel in a plane common to the plane of such slice, intercepting the said slices in said path by a plane surface intercepting said common plane at an angle whereby each slice will strike such plane surface substantially edgewise and will thereby separate into its separate rings.

ROY M. MAGNUSON.

REFERENCES CITED

The following references are of record in the file of this patent:

UNITED STATES PATENTS

| Number | Name | Date |
|---|---|---|
| 126,116 | Weed et al. | Apr. 23, 1872 |
| 1,033,446 | Morton | July 23, 1912 |
| 1,270,039 | Miller | June 18, 1918 |
| 1,676,241 | Ayars | July 10, 1928 |
| 1,799,282 | Conklin | Apr. 7, 1931 |
| 1,964,290 | Krause | June 26, 1934 |
| 2,107,208 | Nankivell | Feb. 1, 1938 |
| 2,169,323 | Martinet | Aug. 15, 1939 |
| 2,187,252 | Urschel | Jan. 16, 1940 |
| 2,262,882 | Bucklin | Nov. 18, 1941 |
| 2,325,779 | Kraber | Aug. 3, 1943 |